United States Patent
Mirsky et al.

(10) Patent No.: US 6,990,566 B2
(45) Date of Patent: *Jan. 24, 2006

(54) MULTI-CHANNEL BI-DIRECTIONAL BUS NETWORK WITH DIRECTION SIDEBAND BIT FOR MULTIPLE CONTEXT PROCESSING ELEMENTS

(75) Inventors: Ethan Mirsky, Mountain View, CA (US); Robert French, Sunnyvale, CA (US); Ian Eslick, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/828,039

(22) Filed: Apr. 20, 2004

(65) Prior Publication Data

US 2004/0236815 A1   Nov. 25, 2004

Related U.S. Application Data

(63) Continuation of application No. 09/364,838, filed on Jul. 30, 1999, now Pat. No. 6,745,317.

(51) Int. Cl.
*G06F 15/17* (2006.01)

(52) U.S. Cl. .......................... 712/11; 712/16; 712/33; 710/31

(58) Field of Classification Search ................. 326/38; 712/11, 15, 33
See application file for complete search history.

(56) References Cited

U.S. PATENT DOCUMENTS

| | | | |
|---|---|---|---|
| 4,597,041 A | 6/1986 | Guyer et al. ................. 712/248 |
| 4,748,585 A | 5/1988 | Chiarulli et al. ............... 712/15 |
| 4,754,412 A | 6/1988 | Deering ....................... 708/521 |
| 4,858,113 A | 8/1989 | Saccardi ...................... 710/317 |
| 4,870,302 A | 9/1989 | Freeman ....................... 326/41 |
| 5,020,059 A | 5/1991 | Gorin et al. .................... 714/3 |
| 5,233,539 A | 8/1993 | Agrawal et al. .............. 716/16 |
| 5,301,340 A | 4/1994 | Cook .......................... 712/24 |
| 5,317,209 A | 5/1994 | Garverick et al. ............ 326/39 |
| 5,336,950 A | 8/1994 | Popli et al. ................... 326/39 |
| 5,426,378 A | 6/1995 | Ong ............................ 326/39 |
| 5,457,408 A | 10/1995 | Leung .......................... 326/38 |
| 5,469,003 A | 11/1995 | Kean ........................... 326/39 |
| 5,581,199 A | 12/1996 | Pierce et al. .................. 326/41 |
| 5,684,980 A | 11/1997 | Casselman .................... 703/23 |
| 5,689,661 A * | 11/1997 | Hayashi et al. ............. 710/316 |
| 5,742,180 A | 4/1998 | DeHon et al. ................ 326/40 |
| 5,754,818 A | 5/1998 | Mohamed .................... 711/207 |
| 5,765,209 A | 6/1998 | Yetter ......................... 711/207 |
| 5,778,439 A | 7/1998 | Trimberger et al. ........ 711/153 |
| 5,790,880 A * | 8/1998 | Ireton .......................... 712/23 |

(Continued)

OTHER PUBLICATIONS

Valero-Garcia, et al.; "Implementation of Systolic Algorithms Using Pipelined Functional Units"; IEEE Proceedings on the International Conf. on Application Specific Array Processors; Sep. 5-7, 1990; pp. 272-283.

(Continued)

*Primary Examiner*—Kenneth S. Kim
(74) *Attorney, Agent, or Firm*—Christie, Parker & Hale, LLP.

(57) ABSTRACT

A method and an apparatus for configuration of multiple context processing elements (MCPEs) are described. The method and an apparatus is capable of selectively transmitting data over a bidirectional shared bus network including a plurality of channels between pairs of MCPEs in the networked array. The method and an apparatus then selectively transmits a sideband bit indicating a direction in which the data is transmitted in the shared bus network.

20 Claims, 20 Drawing Sheets

U.S. PATENT DOCUMENTS

| | | | |
|---|---|---|---|
| 5,880,598 A | 3/1999 | Duong | 326/41 |
| 5,956,518 A | 9/1999 | DeHon et al. | 712/15 |
| 6,681,316 B1 * | 1/2004 | Clermidy et al. | 712/15 |

OTHER PUBLICATIONS

Razdan, et al.; "A High-Performance Microarchitecture with Hardware-Programmable Functional Units"; Micro-27 Proceedings of the 27th Annual International Symposium on Microarchitecture; Nov. 30-Dec. 2, 1994; pp. 172-180.

Guo, et al.; "A Novel Programmable Active Memories: Reconfigurable Systems Come of Age"; IEEE Transactions on VLSI Systems; 1995; pp. 1-15.

Hon, et al.; "Reinventing Computing," Mar. 1996; MIT A1 Lab, p. 1.

Baker, "Programming Silicon"; Aug. 28, 1995, Electronic Engineering Times; p. 73.

Brown; "Smart Compilers Puncture Code Bloat", Oct. 9, 1995; Electronic Engineering Times; pp. 38 and 42.

Snyder; "A Taxonomy of Synchronous Parallel Machines"; Proceedings of the 1988 International Conference on Parallel Processing; Aug. 15-19, 1998; pp. 281-285.

Gray, et al.; "Configurable Hardware: A New Paradigm for Computation"; 1989; Massachusetts Institute of Technology; pp. 279-296.

Carter, et al.; "A User Programmable Reconfigurable Logic Array"; IEEE 1986 Custom Integrated Circuits Conference; pp. 233-235.

Fiske, et al.; "The Reconfigurable Arithmetic Processor"; The 15th Annual International Symposium on Computer Architecture; May 30-Jun. 2, 1988; pp. 30-36.

Beal, et al.; Design of a Processor Element for a High Performance Massively Parallel SIMD System; Int'l Journal of High Speed Computing, vol. 7, No. 3; Sep. 1995, pp. 365-390.

Synder; "An Inquiry into the Benefits of Multiguage Parallel Computation"; Proceedings of the 1995 International Conference on Parallel Processing; Aug. 2-23, 1995; pp. 488-492.

Wang, et al.; "An Array Architecture for Reconfigurable Datapaths: More FPGAs," W.R. Moore & Luk; 1994 Abingdon EE&CS Book; pp. 35-46.

Bridges; :The GPA Machine: A Generally Partitionable MSIMD Architecture; IEEE Third Symposium on The Frontiers of Massively Parallel Computation, Feb. 1990, pp. 196-203.

Morton, et al.; "The Dynamically Reconfigurable CAP Array Chip I"; IEEE Journal of Solid State Circuits, vol. SC-21, No. 5, Oct. 1986, pp. 820-826.

Alexander, et al.; "A Reconfigurable Approach to a Systolic Sorting Architecture"; IEEE Feb. 1989; pp. 1178-1182.

Blazek, et al.; "Design of a Reconfigurable Parallel RISC-Machine"; North-Holland Microprocessing and Microprogramming, 1987; pp. 39-46.

Masera, et al.; "A Microprogrammable Parallel Architecture for DSP"; Proceedings of the International Conference on Circuits and Systems, Jun. 1991; pp. 824-827.

Xilinx Advance Product Information; "XC6200 Field Programmable Gate Arrays"; Jan. 9, 1997 (Version 1.8); pp. 1-53.

* cited by examiner

FIG.9

| 13SW_DEF OR 13SW_REV VALUE | L3_SW1 OUTPUT | L3_SW2 OUTPUT | L3_SW3 OUTPUT | L3_SW4 OUTPUT |
|---|---|---|---|---|
| 0 | L3_W1 | L3_W2 | L3_W3 | L3_W4 |
| 1 | L3_W2 | L3_W3 | L3_W4 | L3_W1 |
| 2 | L3_N1 | L3_N2 | L3_N3 | L3_N4 |
| 3 | L3_N2 | L3_N3 | L3_N4 | L3_N1 |
| 4 | L3_E1 | L3_E2 | L3_E3 | L3_E4 |
| 5 | L3_E2 | L3_E3 | L3_E4 | L3_E1 |
| 6 | L3_S1 | L3_S2 | L3_S3 | L3_S4 |
| 7 | L3_S2 | L3_S3 | L3_S4 | L3_S1 |

FIG. 10

| CONFIG VALUE | L3out1 OUTPUT | L3out2 OUTPUT | L3out3 OUTPUT | L3out4 OUTPUT |
|---|---|---|---|---|
| 0 | FP1 | FP2 | FP2 | FP1 |
| 1 | FP3 | FP4 | FP4 | FP3 |
| 2 | MEM A | MEM B | MEM B | MEM C |
| 3 | ALUout | MULT HIGH | MEM C | MEM D |

FIG. 12

| DATA INTPUT | L3_E1 OUTPUT | L3_E2 OUTPUT | L3_E3 OUTPUT | L3_E4 OUTPUT | L3_S1 OUTPUT | L3_S2 OUTPUT | L3_S3 OUTPUT | L3_S4 OUTPUT |
|---|---|---|---|---|---|---|---|---|
| 0 | L3_W1 | L3_W2 | L3_W3 | L3_W4 | L3_N1 | L3_N2 | L3_N3 | L3_N4 |
| 1 | L3out1 | L3out2 | L3out3 | L3out4 | L3out1 | L3out2 | L3out3 | L3out4 |
| 2 | L3_SW1 | L3_SW2 | L3_SW3 | L3_SW4 | L3_SW4 | L3_SW2 | L3_SW3 | L3_SW4 |
| 3 | L3_SW4 | L3_SW1 | L3_SW2 | L3_SW3 | L3_SW4 | L3_SW1 | L3_SW2 | L3_SW3 |

FIG. 14

| l3cfg_sel value | CONFIG. INPUT SELECTOR OUTPUT |
|---|---|
| 0 | L3_WE/L3_W4 |
| 1 | L3_N3/L3_N4 |
| 2 | L3_E3/L3_E4 |
| 3 | L3_S3/L3_S4 |

FIG. 16

| COUNT | BYTE | BYTE CONTENTS |
|---|---|---|
| 1 | MASK HIGH BYTE | {1'b1, MASK[14:8]} |
| 2 | ADDRESS HIGH BYTE | {VIRTUAL/PHYSICAL SELECT, ADDRESS[14:8]} |
| 3 | MASK LOW BYTE | MASK [7:0] |
| 4 | ADDRESS LOW BYTE | ADDRESS [7:0] |
| 6 | CONTEXT | SEE FIGURE 9 |
| 5 | BYTE COUNT | COUNT [7:0] |
| 7 | BYTE STREAM | DATA |
| ⋮ | | |

FIG. 17

| CONTEXT | BIT <7> READ/WRITE | BITS <6:3>* (MAJOR CONTEXT) | BITS <2:0>* (MINOR CONTEXT) |
|---|---|---|---|
| HARDWIRED RESET CONTEXT | READ=1'b0; WRITE=1'b1; | 0 | 0<br>1<br>7 |
| HARDWIRED STALL CONTEXT | | 1 | 0<br>1<br>7 |
| PROGRAMMABLE RUN CONTEXT | | 2 | 0<br>1<br>7 |
| PROGRAMMABLE RUN CONTEXT | | 3 | 0<br>1<br>7 |
| MAIN MEMORY | | 8 | 0 |
| BLOCK ID | | 9 | 0 |
| FSM STATE | | 10 | 0 |

MULTI-CHANNEL BI-DIRECTIONAL BUS NETWORK WITH DIRECTION SIDEBAND BIT FOR MULTIPLE CONTEXT PROCESSING ELEMENTS

CROSS REFERENCE TO RELATED APPLICATIONS

This application is a continuation of U.S. application Ser. No. 09/364,838 entitled THREE LEVEL DIRECT COMMUNICATION CONNECTIONS BETWEEN NEIGHBORING MULTIPLE CONTEXT PROCESSING ELEMENTS, filed on Jul. 30, 1999 U.S. Pat. No. 6,745,317, the contents of which is expressly incorporated by reference as though set forth in full.

FIELD OF THE INVENTION

This invention relates to array based computing devices. More particularly, this invention relates to a network for configuration of multiple context processing elements.

BACKGROUND OF THE INVENTION

Advances in semiconductor technology have greatly increased the processing power of a single chip general-purpose computing device. The relatively slow increase in inter-chip communication bandwidth requires modern high performance devices to use as much of the potential on-chip processing power as possible. This results in large, dense integrated circuit devices and a large design space of processing architectures. This design space is generally viewed in terms of granularity, wherein granularity dictates that designers have the option of building very large processing units, or many smaller ones, in the same silicon area. Traditional architectures are either very coarse grain, like microprocessors, or very fine grain, like field programmable gate arrays (FPGAs).

Microprocessors, as coarse grain architecture devices, incorporate a few large processing units that operate on wide data words, each unit being hardwired to perform a defined set of instructions on these data words. Generally, each unit is optimized for a different set of instructions, such as integer and floating point, and the units are generally hardwired to operate in parallel. The hardwired nature of these units allows for very rapid instruction execution. In fact, a great deal of area on modern microprocessor chips is dedicated to cache memories in order to support a very high rate of instruction issue. Thus, the devices efficiently handle very dynamic instruction streams.

Most of the silicon area of modern microprocessors is dedicated to storing data and instructions and to control circuitry. Therefore, most of the silicon area is dedicated to allowing computational tasks to heavily reuse the small active portion of the silicon, the arithmetic logic units (ALUs). Consequently very little of the capacity inherent in a processor gets applied to the problem; most of the capacity goes into supporting a high diversity of operations.

Field programmable gate arrays, as very fine grain devices, incorporate a large number of very small processing elements. These elements are arranged in a configurable interconnected network. The configuration data used to define the functionality of the processing units and the network can be thought of as a very large semantically powerful instruction word allowing nearly any operation to be described and mapped to hardware.

Conventional FPGAs allow finer granularity control over processor operations, and dedicate a minimal area to instruction distribution. Consequently, they can deliver more computations per unit of silicon than processors, on a wide range of operations. However, the lack of resources for instruction distribution in a network of prior art conventional FPGAs make them efficient only when the functional diversity is low, that is when the same operation is required repeatedly and that entire operation can be fit spatially onto the FPGAs in the system.

Furthermore, in prior art FPGA networks, retiming of data is often required in order to delay data. This delay is required because data that is produced by one processing element during one clock cycle may not be required by another processing element until several clock cycles after the clock cycle in which it was made available. One prior art technique for dealing with this problem is to configure some processing elements to function as memory devices to store this data. Another prior art technique configures processing elements as delay registers to be used in the FPGA network. The problem with both of these prior art technique is that valuable silicon is wasted by using processing elements as memory and delay registers.

Dynamically programmable gate arrays (DPGAs) dedicate a modest amount of on-chip area to store additional instructions allowing them to support higher operational diversity than traditional FPGAs. However, the silicon area necessary to support this diversity must be dedicated at fabrication time and consumes area whether or not the additional diversity is required. The amount of diversity supported, that is, the number of instructions supported, is also fixed at fabrication time. Furthermore, when regular data path operations are required all instruction stores are required to be programmed with the same data using a global signal broadcast to all DPGAs.

The limitations present in the prior art FPGA and DPGA networks in the form of limited control over configuration of the individual FPGAs and DPGAs of the network severely limits the functional diversity of the networks. For example, in one prior art FPGA network, all FPGAs must be configured at the same time to contain the same configurations. Consequently, rather than separate the resources for instruction storage and distribution from the resources for data storage and computation, and dedicate silicon resources to each of these resources at fabrication time, there is a need for an architecture that unifies these resources. Once unified, traditional instruction and control resources can be decomposed along with computing resources and can be deployed in an application specific manner. Chip capacity can be selectively deployed to dynamically support active computation or control reuse of computational resources depending on the needs of the application and the available hardware resources.

SUMMARY OF THE INVENTION

A method and an apparatus for configuration of multiple context processing elements (MCPEs)are described. According to one aspect of the invention, the structure that joins the MCPE cores into a complete array in one embodiment is actually a set of several mesh-like interconnect structures. Each interconnect structure forms a network, and each network is independent in that it uses different paths, but the networks join at MCPE input switches. The network structure of one embodiment of the present invention is comprised of a local area broadcast network (level 1), a switched interconnect network (level 2), a shared bus network (level 3), and a broadcast network. In one embodiment, the level 3 network is used to carry configuration data for the MCPEs while the broadcast network is used to carry configuration data for the level 3 network drivers and switches. In one embodiment, the level 3 network is bidirectional and dynamically routable.

Each multiple context processing element in a networked array of multiple context processing elements has an assigned physical identification. This physical identification may be assigned at the time of network development. Virtual identifications may also be assigned to a number of the multiple context processing elements. Data is transmitted to at least one of the multiple context processing elements of the array. The data comprises control data, configuration data, an address mask, and a destination identification. The transmitted data is also used to select whether the physical identification or the virtual identification will be used to select multiple context processing elements for manipulation.

The transmitted address mask is applied to the physical or virtual identification and to a destination identification. The masked physical or virtual identification is compared to the masked destination identification. When the masked physical or virtual identification of a multiple context processing element matches the masked destination identification, at least one of the number of multiple context processing elements are manipulated in response to the transmitted data. Manipulation comprises programming a multiple context processing element with at least one configuration memory context and selecting a configuration memory context to control the functioning of the multiple context processing element. The manipulation may occur while the multiple context processing element is executing a present function. The manipulated multiple context processing elements define at least one region of the networked array, the region having an arbitrary shape.

These and other features, aspects, and advantages of the present invention will be apparent from the accompanying drawings and from the detailed description and appended claims which follow.

BRIEF DESCRIPTION OF THE DRAWINGS

The present invention is illustrated by way of example and not limitation in the figures of the accompanying drawings, in which:

FIG. 9 illustrates a selection between eight level 3 inputs using a single input switch.

FIG. 10 shows an encoding of configuration words for a level 3 network.

FIG. 12 shows inputs to a multiplexor of the output driver of FIG. 11.

FIG. 14 shows an encoding for a selection among #3 connections and #4 connections of a level 3 network.

FIG. 16 is an encoding of the configuration byte stream as received by the CNI in one embodiment.

FIG. 17 is an encoding of the command/context byte in one embodiment.

DETAILED DESCRIPTION OF THE INVENTION

A unified configuration and control network for multiple context processing elements is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid obscuring the present invention.

Figure 1:
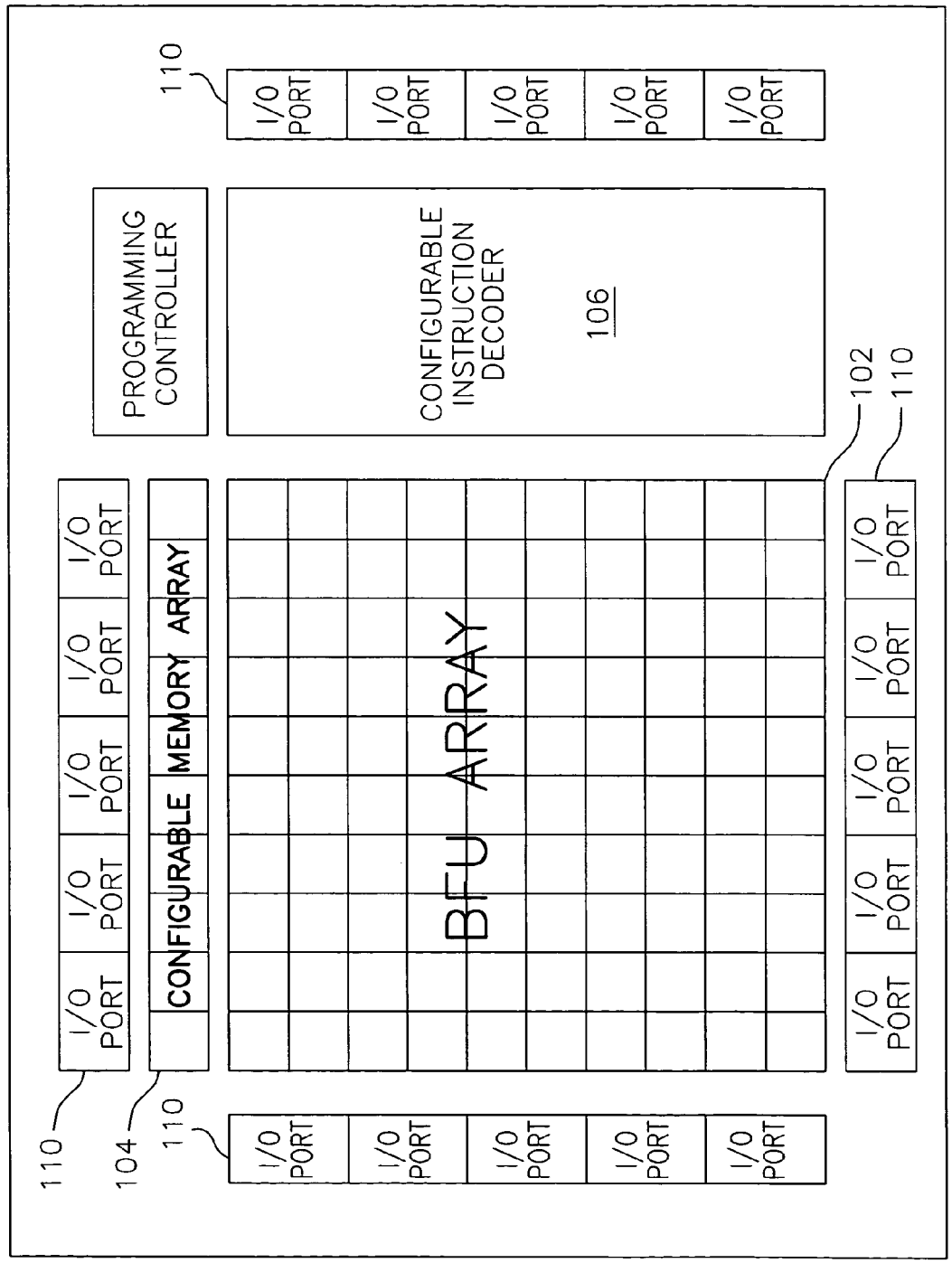
FIG. 1 is the overall chip architecture of one embodiment. This chip architecture comprises many highly integrated components.

FIG. 1 is the overall chip architecture of one embodiment. This chip architecture comprises many highly integrated components. While prior art chip architectures fix resources at fabrication time, specifically instruction source and distribution, the chip architecture of the present invention is flexible. This architecture uses flexible instruction distribution that allows position independent configuration and control of a number of multiple context processing elements (MCPEs) resulting in superior performance provided by the MCPEs. The flexible architecture of the present invention uses local and global control to provide selective configuration and control of each MCPE in an array; the selective configuration and control occurs concurrently with present function execution in the MCPEs.

The chip of one embodiment of the present invention is composed of, but not limited to, a 10×10 array of identical eight-bit functional units, or MCPEs 102, which are connected through a reconfigurable interconnect network. The MCPEs 102 serve as building blocks out of which a wide variety of computing structures may be created. The array size may vary between 2×2 MCPEs and 16×16 MCPEs, or even more depending upon the allowable die area and the desired performance. A perimeter network ring, or a ring of network wires and switches that surrounds the core array, provides the interconnect between the MCPEs and perimeter functional blocks.

Surrounding the array are several specialized units that may perform functions that are too difficult or expensive to decompose into the array. These specialized units may be coupled to the array using selected MCPEs from the array. These specialized units can include large memory blocks called configurable memory blocks 104. In one embodiment these configurable memory blocks 104 comprise eight blocks, two per side, of 4 kilobyte memory blocks. Other specialized units include at least one configurable instruction decoder 106.

Furthermore, the perimeter area holds the various interfaces that the chip of one embodiment uses to communicate with the outside world including: input/output (I/O) ports; a peripheral component interface (PCI) controller, which may be a standard 32-bit PCI interface; one or more synchronous burst static random access memory (SRAM) controllers; a programming controller that is the boot-up and master control block for the configuration network; a master clock input and phase-locked loop (PLL) control/configuration; a Joint Test Action Group (JTAG) test access port connected to all the serial scan chains on the chip; and I/O pins that are the actual pins that connect to the outside world.

Figure 2:
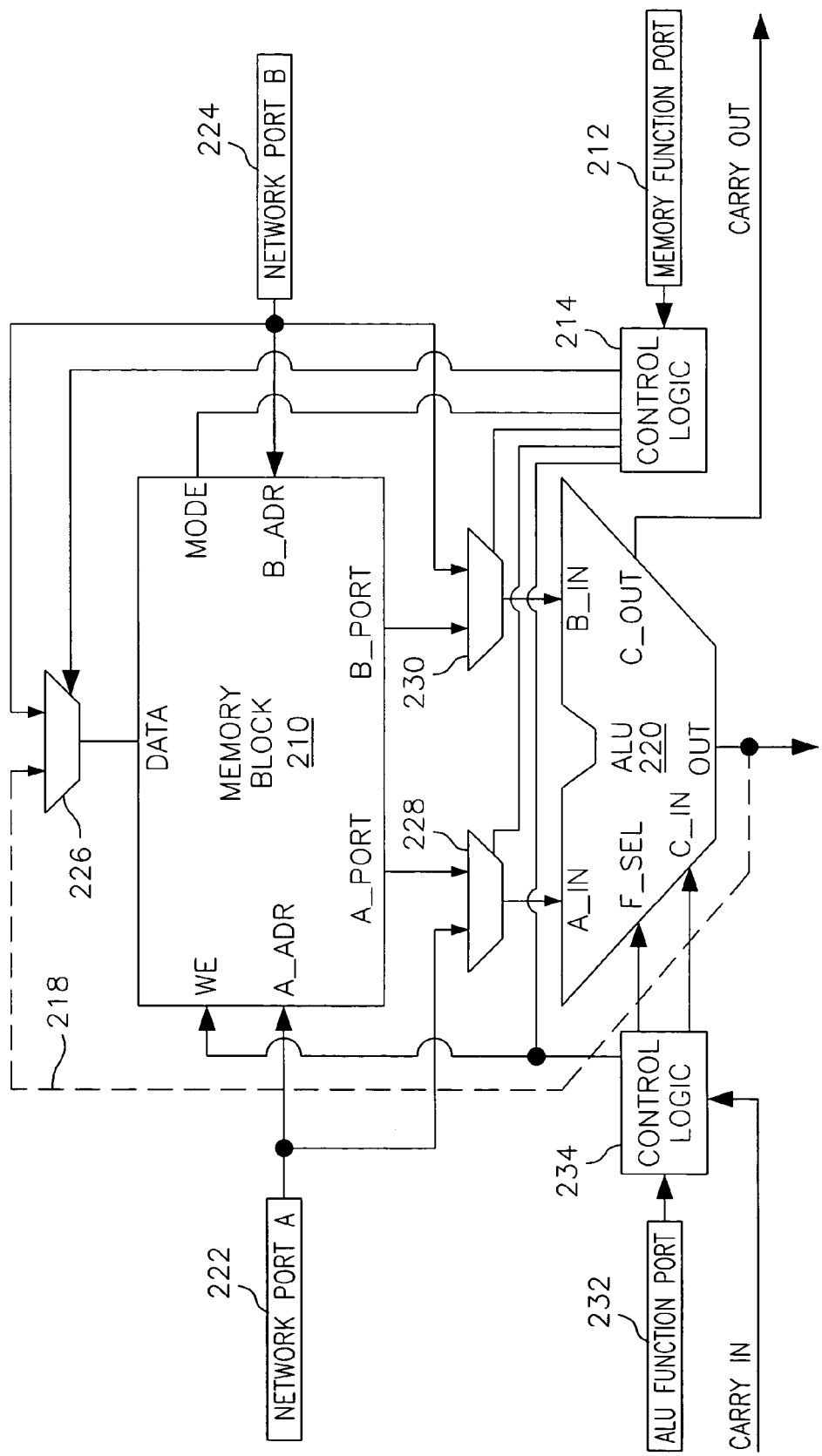
FIG. 2 is an eight bit MCPE core of one embodiment of the present invention.

FIG. 2 is an eight bit MCPE core of one embodiment of the present invention. Primarily the MCPE core comprises memory block 210 and basic ALU core 220. The main memory block 210 is a 256 word by eight bit wide memory, which is arranged to be used in either single or dual port modes. In dual port mode the memory size is reduced to 128 words in order to be able to perform two simultaneous read operations without increasing the read latency of the memory. Network port A 222, network port B 224, ALU function port 232, control logic 214 and 234, and memory function port 212 each have configuration memories (not shown) associated with them. The configuration memories of these elements are distributed and are coupled to a Configuration Network Interface (CNI) (not shown) in one embodiment. These connections may be serial connections but are not so limited. The CNI couples all configuration memories associated with network port A 222, network port B 224, ALU function port 232, control logic 214 and 234, and memory function port 212 thereby controlling these configuration memories. The distributed configuration memory stores configuration words that control the configuration of the interconnections. The configuration memory also stores configuration information for the control architecture. Optionally it can also be a multiple context memory that receives context selecting signals broadcast globally and locally from a variety of sources.

Figure 3:
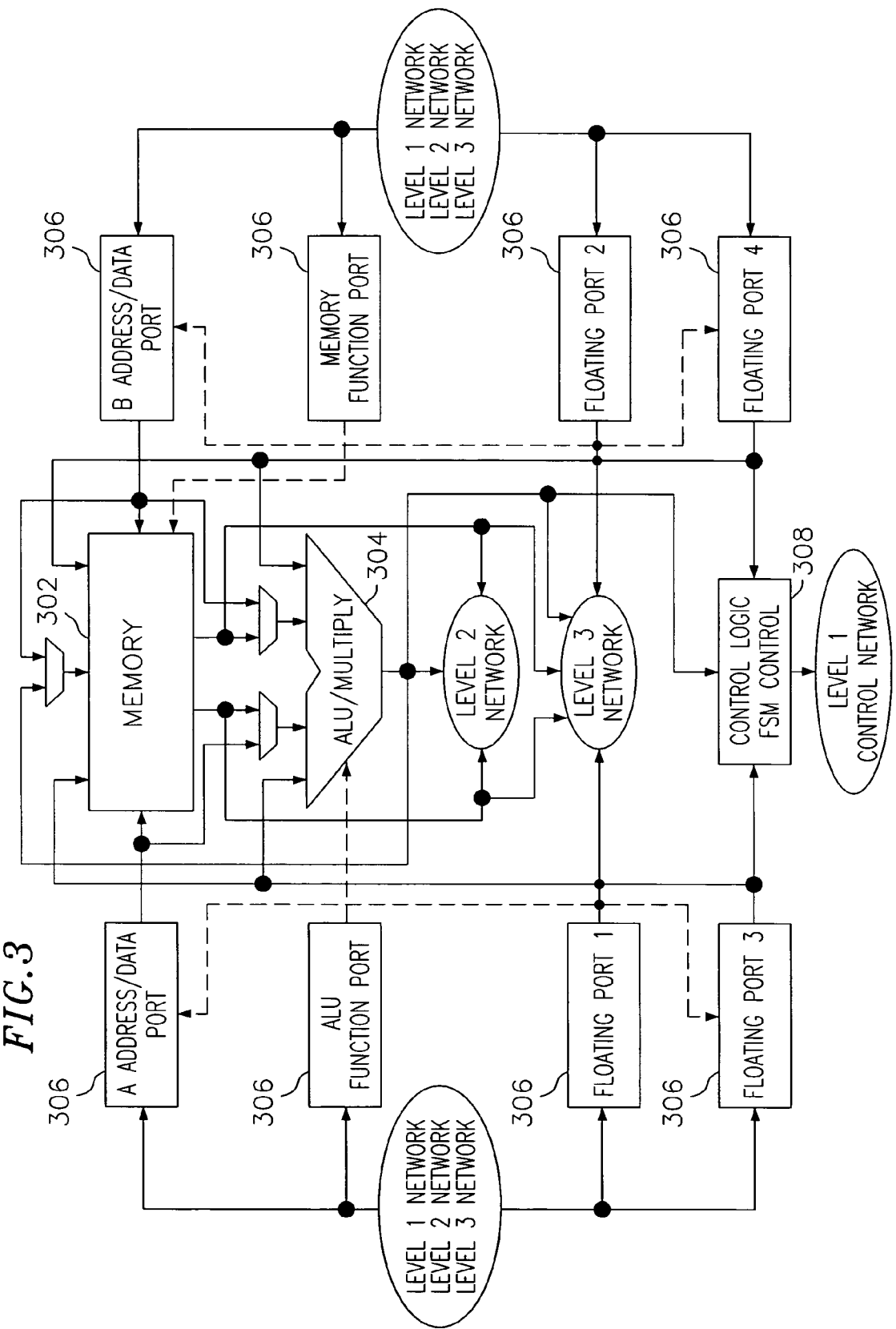
FIG. 3 is a data flow diagram of the MCPE of one embodiment.

The structure of each MCPE allows for a great deal of flexibility when using the MCPEs to create networked processing structures. FIG. 3 is a data flow diagram of the MCPE of one embodiment. The major components of the MCPE include static random access memory (SRAM) main memory 302, ALU with multiplier and accumulate unit 304, network ports 306, and control logic 308. The solid lines mark data flow paths while the dashed lines mark control paths; all of the lines are one or more bits wide in one embodiment. There is a great deal of flexibility available within the MCPE because most of the major components may serve several different functions depending on the MCPE configuration.

The MCPE main memory 302 is a group of 256 eight bit SRAM cells that can operate in one of four modes. It takes in up to two eight bit addresses from A and B address/data ports, depending upon the mode of operation. It also takes in up to four bytes of data, which can be from four floating ports, the B address/data port, the ALU output, or the high byte from the multiplier. The main memory 302 outputs up to four bytes of data. Two of these bytes, memory A and B, are available to the MCPE's ALU and can be directly driven onto the level 2 network. The other two bytes, memory C and D, are only available to the network. The output of the memory function port 306 controls the cycle-by-cycle operation of the memory 302 and the internal MCPE data paths as well as the operation of some parts of the ALU 304 and the control logic 308. The MCPE main memory may also be implemented as a static register file in order to save power.

Each MCPE contains a computational unit 304 comprised of three semi-independent functional blocks. The three semi-independent functional blocks comprise an eight bit wide ALU, an 8×8 to sixteen bit multiplier, and a sixteen bit accumulator. The ALU block, in one embodiment, performs logical, shift, arithmetic, and multiplication operations, but is not so limited. The ALU function port 306 specifies the cycle-by-cycle operation of the computational unit. The computational units in orthogonally adjacent MCPEs can be chained to form wider-word data paths.

The MCPE network ports connect the MCPE network to the internal MCPE logic (memory, ALU, and control). There are eight ports in each MCPE, each serving a different set of purposes. The eight ports comprise two address/data ports, two function ports, and four floating ports. The two address/data ports feed addresses and data into the MCPE memories and ALU. The two function ports feed instructions into the MCPE logic. The four floating ports may serve multiple functions. The determination of what function they are serving is made by the configuration of the receivers of their data.

The MCPEs of one embodiment are the building blocks out of which more complex processing structures may be created. The structure that joins the MCPE cores into a complete array in one embodiment is actually a set of several mesh-like interconnect structures. Each interconnect structure forms a network, and each network is independent in that it uses different paths, but the networks do join at the MCPE input switches. The network structure of one embodiment of the present invention is comprised of a local area broadcast network (level 1), a switched interconnect network (level 2), a shared bus network (level 3), and a broadcast network. In one embodiment, the level 3 network is used to carry configuration data for the MCPEs while the broadcast network is used to carry configuration data for the level 3 drivers and switches.

For purposes of discussion the networks are identified as a level 1, level 2, and level 3 networks and corresponding signals transmitted thereon as first signals, second signals and third signals, respectively. However, this form of identification for purposes of discussions does not dictate the ordering of transmission of the signals.

Figure 4:
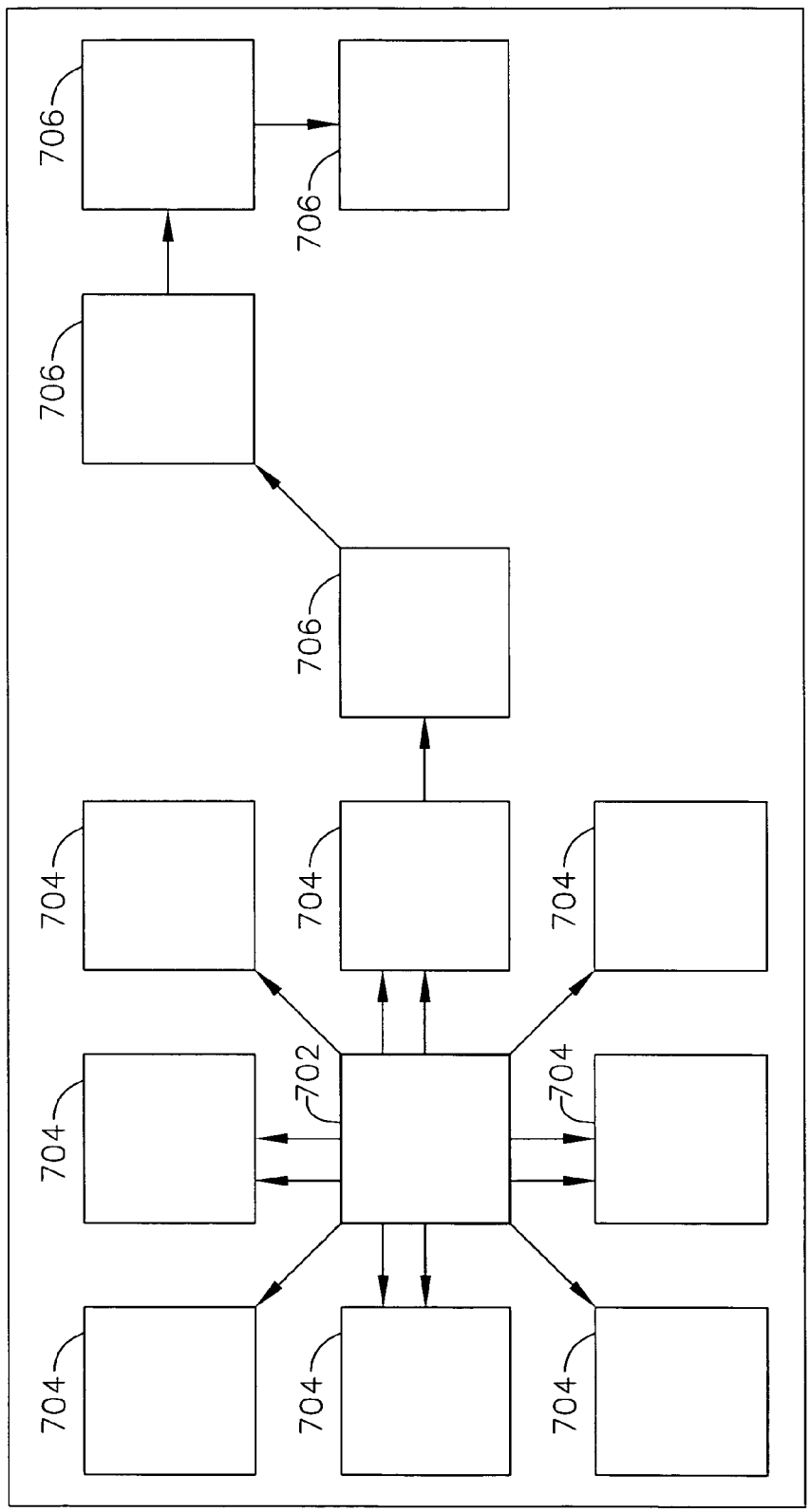
FIG. 4 is the level 1 network of one embodiment.

FIG. 4 is the level 1 network of one embodiment. The level 1 network, or bit-wide local interconnect, consists of direct point-to-point communications between each MCPE 702 and the eight nearest neighbors 704. Each MCPE 702 can output up to 12 values comprising two in each of the orthogonal directions, and one in each diagonal. The level 1 network carries bit-oriented control signals between these local groups of MCPEs. The connections of level 1 only travel one MCPE away, but the values can be routed through the level 1 switched mesh structure to other MCPEs 706. Each connection consists of a separate input and output wire. Configuration for this network is stored along with MCPE configuration.

Figure 5:
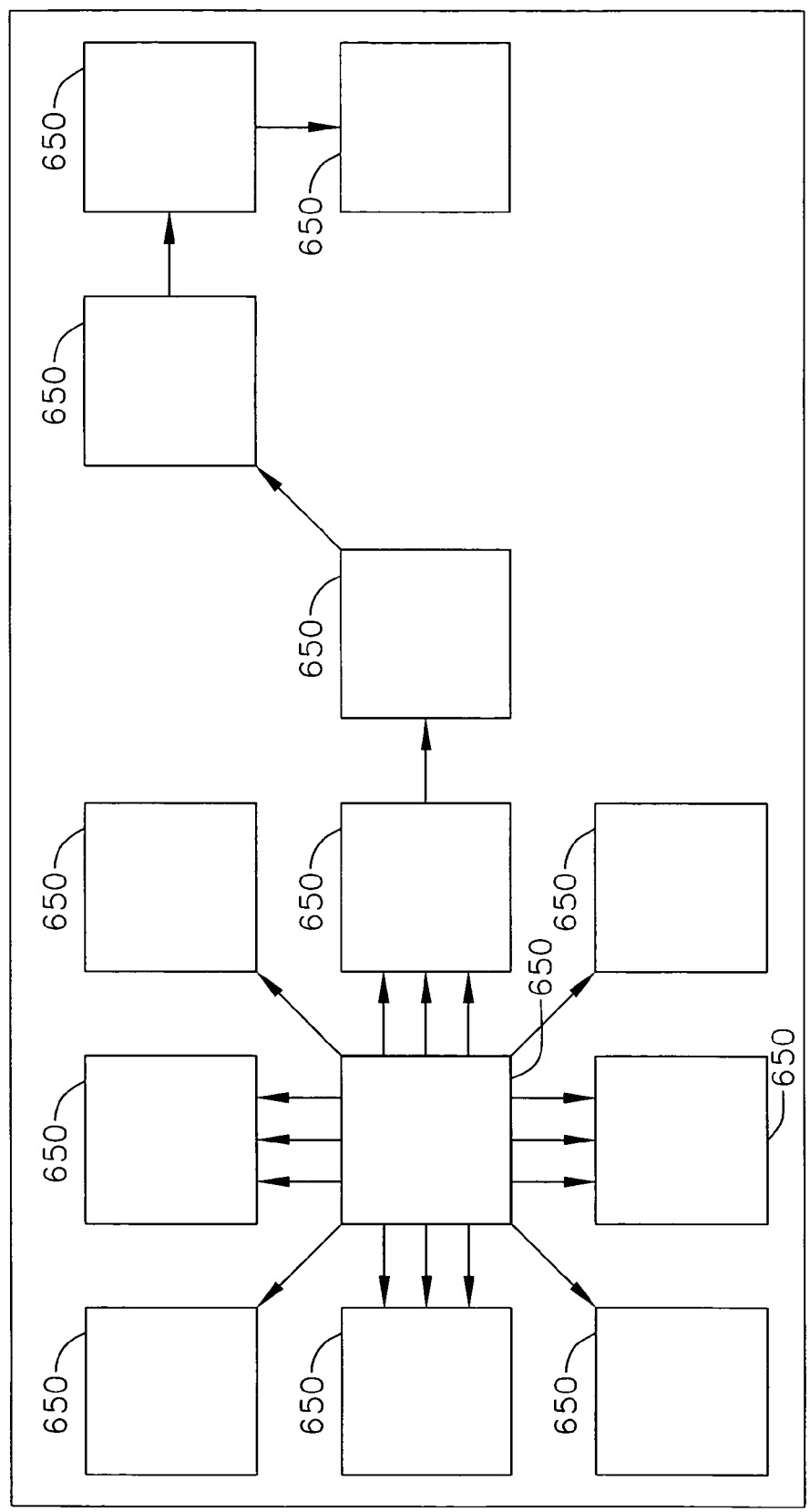
FIG. 5 is the level 2 network of one embodiment.

FIG. 5 is the level 2 network of one embodiment. The level 2 network, or byte-wide local interconnect, is used to carry data, instructions, or addresses in local groups of MCPEs 650. It is a byte-wide version of level 1 having additional connections. This level uses relatively short wires linked through a set of switches. The level 2 network is the primary means of local and semi-local MCPE communication, and level 2 does require routing. Using the level 2 network each MCPE 650 can output up to 16 values, at least two in each of the orthogonal directions and at least one in each diagonal. Each connection consists of separate input and output wires. These connections only travel one MCPE away, but the values can be routed through level 2 switches to other MCPEs. Preferably configuration for this network is also stored along with MCPE configuration.

Figure 6:
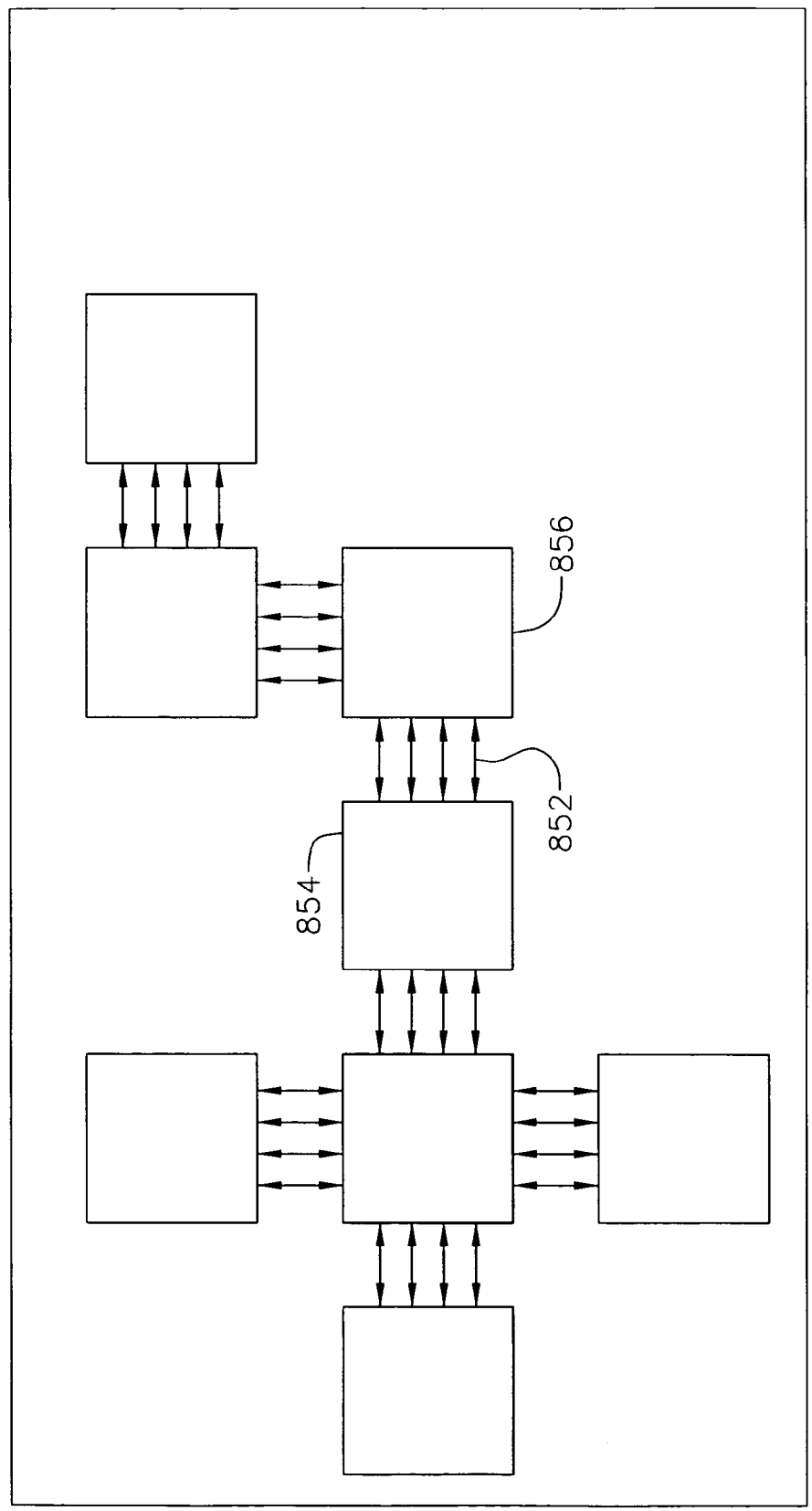
FIG. 6 is the level 3 network of one embodiment.

FIG. 6 is the level 3 network of one embodiment. In this one embodiment, the level 3 network comprises connections 852 of four channels between each pair of MCPEs 854 and 856 arranged along the major axes of the MCPE array providing for communication of data, instructions, and addresses from a single MCPE or a logical grouping of MCPEs to a periphery component or different MCPE group. In one embodiment, the data includes configuration data for the MCPEs. These connections can be byte serial or byte parallel. Communication in the level 3 network is bi-directional by nature. For example, a connection to a periphery memory requires that data be both read and written. In one embodiment, to reduce the number of physical channels required in the network and the size of the level 3 MCPE switches, the level 3 network is physically bidirectional. If the level 3 network is not bidirectional, physical up channels and down channels are required for logical read/write connections. Multiplexing onto a single bus is latency expensive, but saves on critical wire resources. In cases where parallelism is needed, two channels may be used.

The level 3 network in the MCPE array consists of connections of four channels between each pair of MCPEs arranged along the major axes of the two dimensional mesh. In one embodiment, each connection consists of an 8-bit bidirectional port (implying tri-state drivers on the outputs) with two directional sideband bits for signaling.

At the physical layer, the sideband bits indicate when a given direction is driving its value. Sideband bits are also interpreted by the endpoints of a given level 3 circuit to enable higher layer protocol information to be encoded. In one embodiment, a sideband bit is driven if and only if a value is currently being driven. This means that unless there is a software error, the sideband bits should never be driven in both directions simultaneously. An error signal is asserted by the driver logic if this event ever occurs dynamically.

In one embodiment, the bidirectional data busses are named: L3_N1, L3_N2, L3_N3, L3_N4, L3_El, etc. The sideband signals are labeled L3_N1out, etc. for upstream (outgoing) connections and L3_N1in for downstream (incoming) connections. In one embodiment, the level 3 wires, unlike level 1 and level 2 wires, are not numbered clockwise around the cell, but are numbered according to the X or Y distance from the southwest (SW) corner. This is done so that all "#1" connections connect straight through to another "#1" connection.

In one embodiment, level 3 physical connections are capable of supporting unidirectional and bidirectional communication. Level 3 connections include 8, 16, 24 and 32 bit wide links made up of byte-wide channels. The level 3 network may be byte serial or word serial, that is, words may be sequentialized down a byte-wide channel or sent down a word-wide channel.

In one embodiment, logical connections between two level 3 nodes may be characterized as static and unidirectional, as asynchronous and unidirectional or as asynchronous and directional.

In the case of static unidirectional connections, the network channel is always moving data in a single direction to an endpoint that has information (acquired at compile time) regarding what to do with the data. Latency and a data stream structure is predetermined.

In the case of asynchronous unidirectional connections, the network starts in a "ready to send" state and the data is intended to move in one direction (single value, packet or full stream). The receiving endpoint then sends a "go ahead" signal which starts the transfer. The data arrives either a known or unknown number of cycles later, depending upon endpoint configuration. When the number of cycles is unknown, a sideband bit indicates valid data. If the local unit cannot directly respond to the sideband bit, the local unit may remain in a halt state until the bit arrives. When the number of cycles is known, the execution unit may be scheduled unless execution starts on receipt of data (that is, unless a data driven architecture has been defined in software). The connection is pre-configured by a software construct not pertinent to the present invention.

In the case of asynchronous directional transfer, the destination node sends a packet of data to the source. A control bit remains asserted as long as the data sent remains valid. The source port receives the packet of data and interprets it as data, control information or as an identification address that tells the port if it is the port asked to return data. The source port determines whether it is the port asked to return data by interpreting additional control or target address words. The source port then returns a packet or stream of data in response to the received packet. The initiator has control of the logical network connection.

In one embodiment, the level 3 network is dynamically routable, which supports position independence of hardware modules. Configuration of a dynamically routable level 3 network is separate from the main MCPE configuration. A connection between two endpoints through a series of level 3 array and periphery nodes is called a "circuit" and may be set up and taken down by the configuration network. In one embodiment, each connection 852 consists of an 8-bit bidirectional port.

Figure 7:
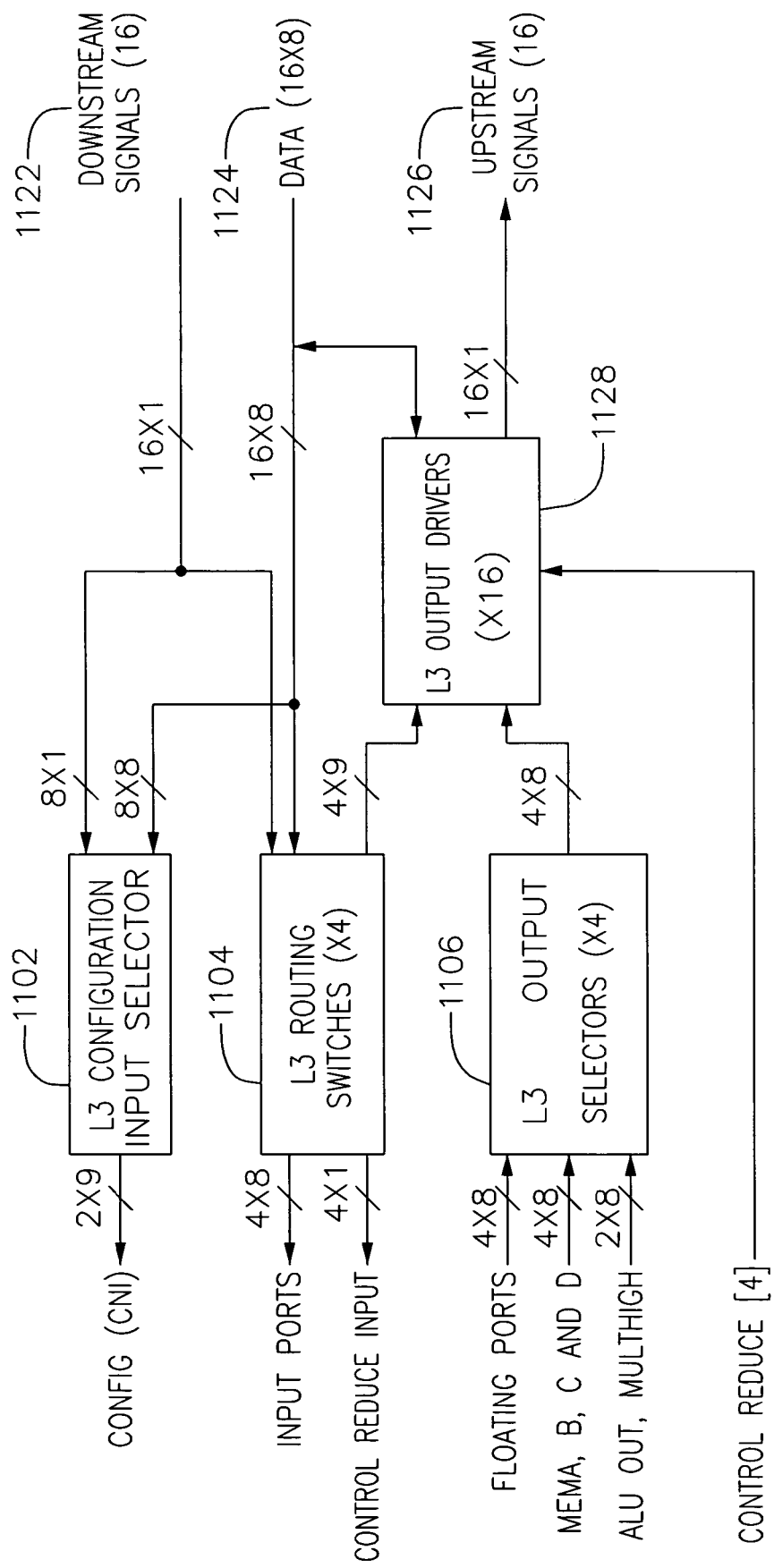
FIG. 7 is a diagram of features of an array node of a level 3 network.

The MCPE node connects to 16 busses, four in each cardinal direction. Each bus is associated with an output driver. Selected subsets of the incoming busses are fed to a set of four switches. The major features of an array node are illustrated in FIG. 7. The level 3 configuration input selector 1102 receives downstream signals 1122 and data 1124 and outputs configuration data to the CNI. The level 3 routing switches 1104 receive downstream signals 1122 and data 1124 and send outputs to the input ports and to the control reduce input. Data 1124 may also be output from level 3 routing switches 1104. The L3 output selectors 1106 receive signals from the floating ports, memories A, B, C, and D, and the ALU, and output signals to the output drivers 1128. The control reduce input is connected to output drivers 1128. Level 3 output drivers 1128 output upstream signals 1126 and data 1124. Level 3 output drivers 1128 also receive data 1124.

The level 3 routing switches 1104 provide limited connectivity between routing tracks in the horizontal and vertical directions as well as 'capture' values that can be fed into the MCPE input ports. The drivers on each side select the value to drive onto the level 3 busses, a set of four MCPE output selectors and inputs from the opposite side.

Two of the "tracks" in each direction (tracks #3 and #4) provide inputs to the configuration network for configuring the MCPE. Debugging readout is supported by replacing one of the MCPE Mem inputs to the #4 output selector switch with configuration data and configuring the level 3 nodes to create a circuit to the appropriate output port.

Figure 8:
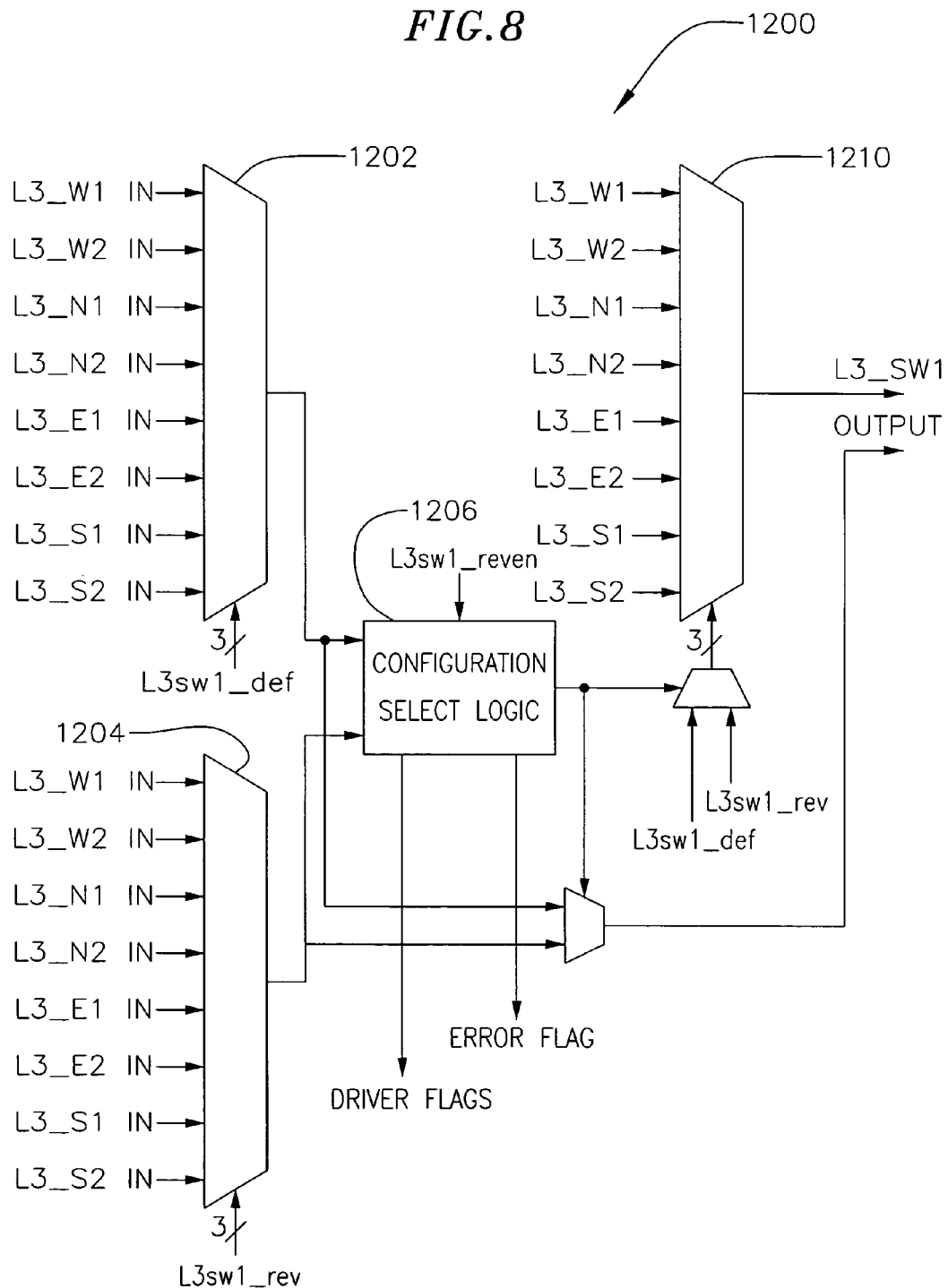
FIG. 8 is an embodiment of a switch architecture of MCPE input switch.

There are four level 3 routing switches in each MCPE, each one associated with one of the four level 3 connections on each side of the MCPE. One embodiment of a routing switch architecture is shown in FIG. 8. The level 3 routing switch 1200 includes a single switch which selects between eight level 3 inputs, as shown in FIG. 9. L3_SW1 takes its input from W1, W2, N1, N2, E1, E2, S1, and S2, while L3_SW2 takes its input from W2, W3, N2, N3, E2, E3, S2, and S3, etc. This pattern allows the signals on the level 3 wires to change "tracks".

In one embodiment, the switch 1200 outputs 8 bits of data, in addition to the associated downstream (incoming) sideband signal. These four outputs are fed into the MCPE input ports and to the four output drivers associated with the inputs of the switch (L3_SW1 outputs to W1, N1, E1, S1, while L3_SW2 outputs to W2, N2, E2, S2, etc.).

The input selection is made by two configuration words which control multiplexor 1210: L3sw*_def (Default Selection) and L3sw*_rev (Reverse Selection). The first, default selection is the normal mode. The reverse selection is used when an level 3 connection "turns around". This occurs when the default direction sideband bit, which is selected by the multiplexor 1202, is low, while the sideband bit in the reverse direction, which is selected by the multiplexor 1204, is high and the 13sw*_reven (reverse enable) configuration bit is high. In all other cases, the switch selection is performed by the default configuration.

The selection logic also produces eight bits of "driver flags". One bit is sent to each driver associated with the switch's input. Each bit is set to zero unless the switch is currently using that line's input, in which case the bit is set to one. The drivers use this bit to determine whether or not the connection is being "turned around".

The configuration select logic 1206 also produces an error flag when both selected sideband bits are high. This signal is propagated to an output pin of the chip so that the external system can determine that an error has occurred. In addition, the flag sets a register that is part of the global debugging scan chain so that the location of the error can be determined. The error flag does not stop the operation of the chip in any way.

In one embodiment, there are four MCPE output selectors in each MCPE, labeled L3out1, L3out2, L3out3, and L3out4. In one embodiment, each MCPE output selector is a 4-input, 1-output, 8-bit-wide multiplexor. The output selectors take the floating port outputs and direct outputs of the MCPE and select four busses (memory, ALU, accumulator high byte) which are fed into the level 3 drivers. The output selectors are controlled by the two-bit configuration words L3out1-sel, L3out2-sel, L3out3-sel, and L3out4-sel. One encoding of these words is shown in FIG. 10.

Figure 11:
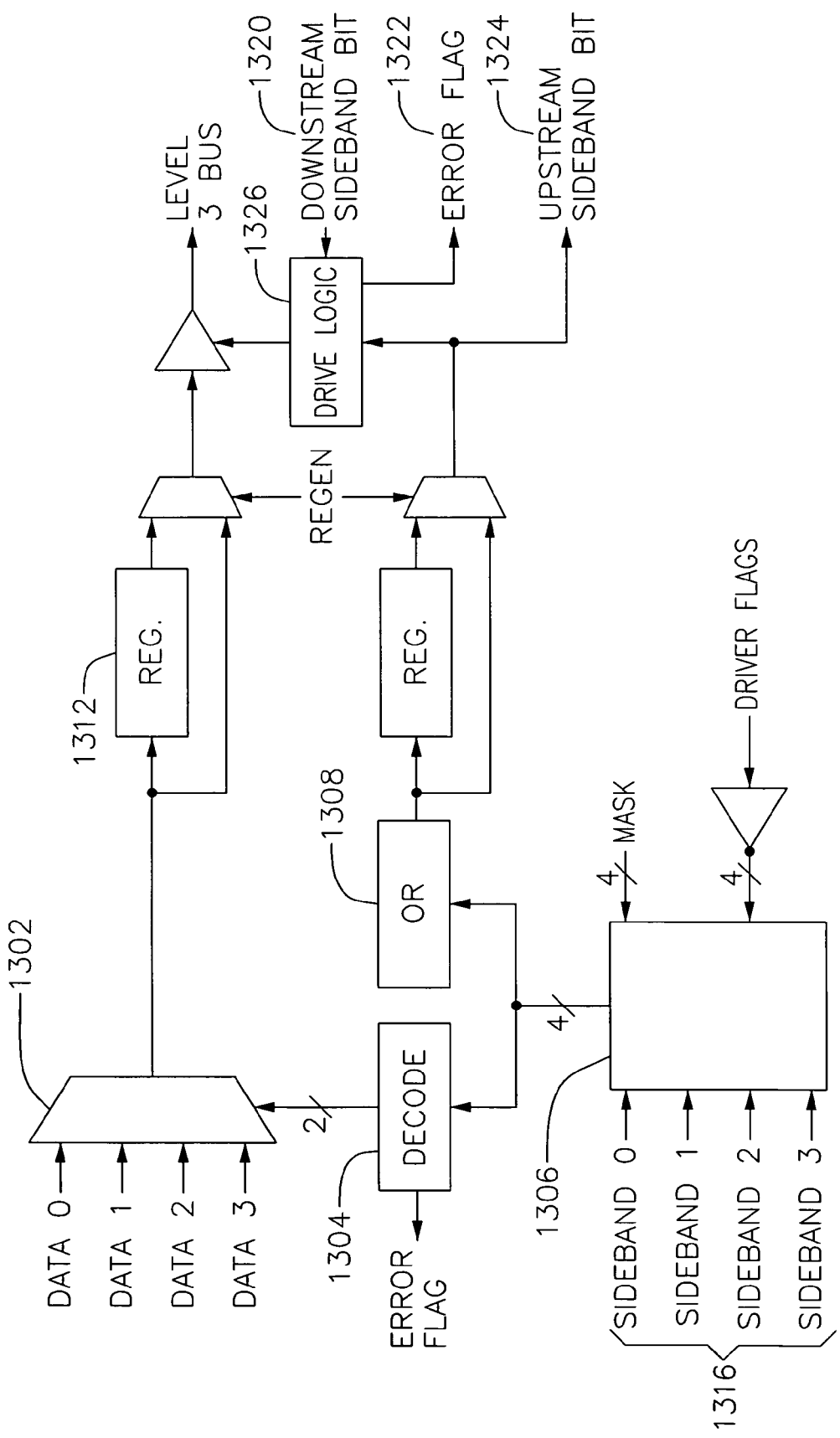
FIG. 11 is an embodiment of an output driver of a level 3 network.

In one embodiment, there are 16 level 3 output drivers in each MCPE, one for each level 3 line. FIG. 11 shows the architecture of one embodiment of an output driver. The main data path consists of a single selector multiplexor 1302 and a register 1312. The inputs to the multiplexor 1302 are different for each driver. The inputs to the multiplexor 1302 are shown in FIG. 12. The register 1312 is selected when the configuration bit "regen" is set high. The selection of which input is output is made by the four incoming sideband bits 1316.

The four incoming sideband bits 1316 are bit-wise ANDed with the inversion of the driver flags from the switches and a configuration mask by logic 1306. Logic 1306 outputs a result to the decoder 1304 and to OR gate 1308. The result is used to select which inputs to a driver are allowed to drive. If the mask is all zeros, the driver will never drive. Also, if a driver flag goes high, the input of the switch that generated the flag will be ignored.

The resulting four bits are used in a one-hot encoding of the input selector. If more than one bit is high at the same time, the decoder outputs an error flag 1322 and the Data 0 input is selected. This selection mechanism allows a level 3 connection that has multiple receivers to be "turned around" by one of them.

If any of the masked sideband bits is high, then the driver assumes that it is driving. This bit is sent out as the upstream sideband bit 1324. The drive logic block 1326 checks to see if the downstream block is also asserted using downstream sideband bit 1320. If it is, the drive logic does not enable the output driver and also asserts the error flag 1322. Otherwise, the output driver is enabled. Error flag 1322 functions in the same way as error flags in the switches.

In one embodiment, the L3out4 selector has a special function during configuration reads When a read operation is initiated, the MCPE's CNI block will switch the MemD input to L3out4 to its own configuration output. It will also replace the reduce control[4] sideband bit with its own sideband output. L3out4 and the output drivers must be properly configured in order for this data to be sent out on the network; the CNI does not change the network settings in this mode.

Figure 13:
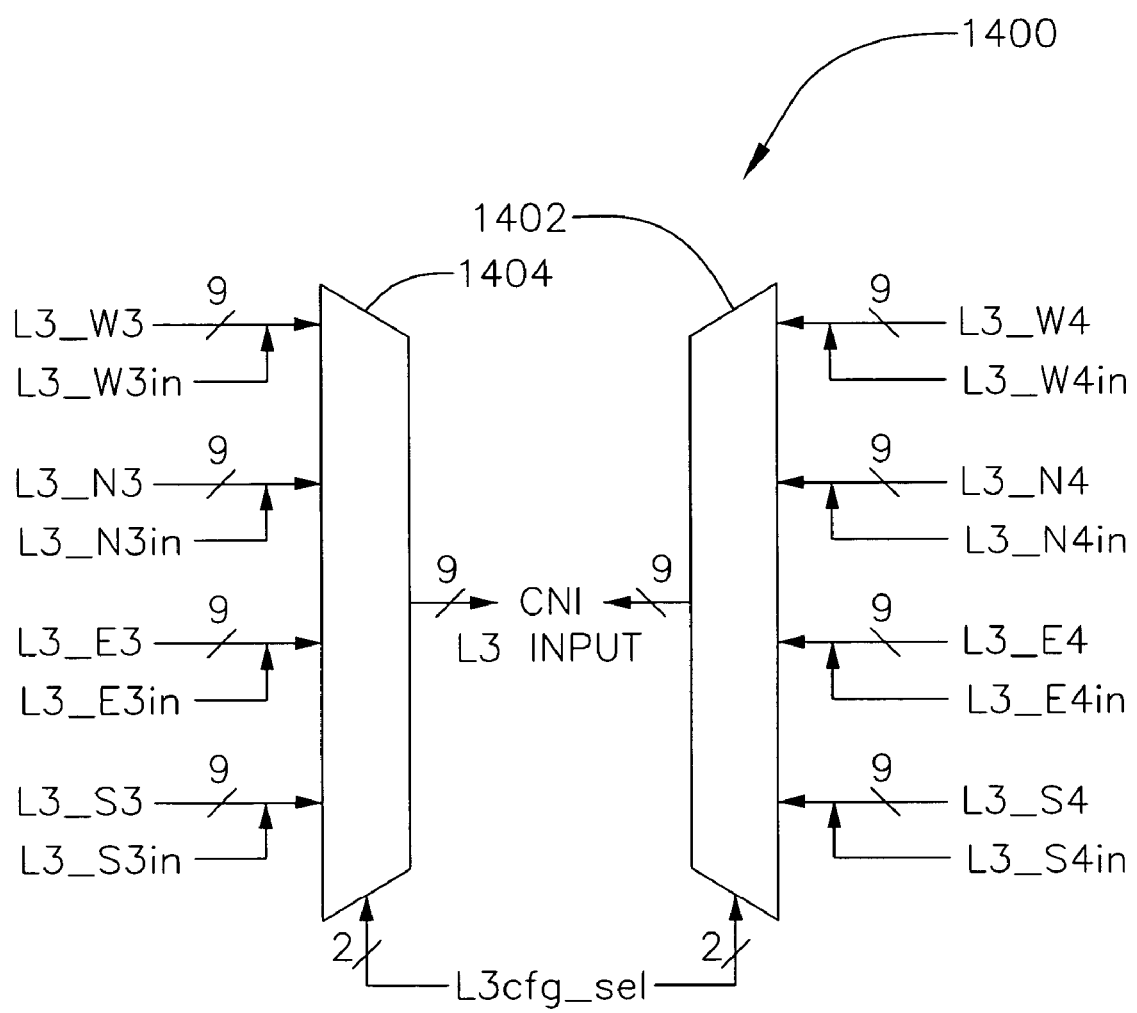
FIG. 13 is a diagram of an embodiment of a configuration input selector of a level 3 network.

In one embodiment, the configuration input selector is a special level 3 switch that is used only to input configuration data into the MCPE's CNI. FIG. 13 shows an architecture of a configuration input selector 1400. Configuration input selector 1400 includes two multiplexors 1402 and 1404 that use a single configuration word to select from the incoming #3 and #4 connections. Two words are sent to the CNI, which chooses one of them. FIG. 14 shows an encoding for a selection among #3 connections and #4 connections.

In one embodiment, each MCPE has a single register that will set to one whenever any of the error flags in the MCPE go high for a full cycle. The register is visible on the scan chain of the chip and provides external visibility to the level 3 error flags. The register will remain set until a full chip reset occurs. In one embodiment, there are a total of 20 error flags in the MCPE: 16 level 3 driver error flags and four level 3 switch error flags.

Figure 15:
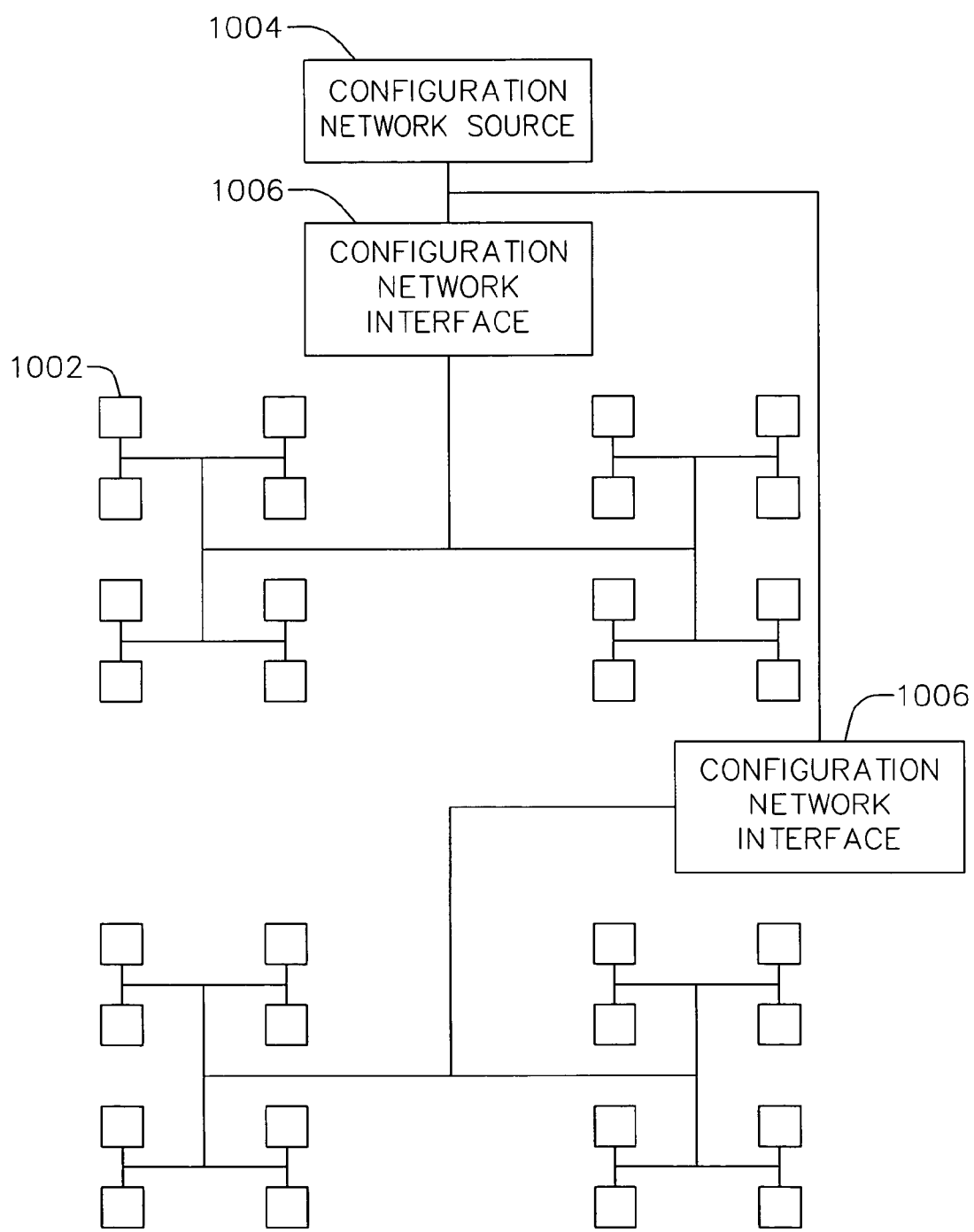
FIG. 15 is the broadcast, or configuration, network used in one embodiment.

FIG. 15 is the broadcast, or configuration, network used in one embodiment. This broadcast network is an H-tree network structure with a single source and multiple receivers in which individual MCPEs 1002 may be written to. In one embodiment, the broadcast network is the mechanism by which configuration data for the level 3 network drivers and switches is communicated, while the level 3 network is the mechanism by which the MCPEs are configured. In other embodiments, the broadcast network is the mechanism by which both the MCPEs and the perimeter units are configured programmed.

The broadcast network in one embodiment comprises a nine bit broadcast channel that is structured to both program and control the on-chip MCPE 1002 configuration memories. The broadcast network comprises a central source, or Configuration Network Source (CNS) 1004, and one Configuration Network Interface (CNI) block 1006 for each major component, or one in each MCPE with others assigned to individual or groups of non-MCPE blocks. The CNI 1006 comprises a hardwired finite state machine, several state registers, and an eight bit loadable clearable counter used to maintain timing. The CNS 1004 broadcasts to the CNIs 1006 on the chip according to a specific protocol. The network is arranged so that the CNIs 1006 of one embodiment receive the broadcast within the same clock cycle. This allows the broadcast network to be used as a global synchronization mechanism as it has a fixed latency to all parts of the chip. Therefore, the broadcast network functions primarily to program the level 3 network, and to prepare receiving CNIs for configuration transactions. Typically, the bulk of configuration data is carried over the level 3 network, however the broadcast network can also perform that function. The broadcast network has overriding authority over any other programmable action on the chip.

A CNI block is the receiving end of the broadcast network. Each CNI has two addresses: a physical, hardwired address and a virtual, programmable address. The latter can be used with a broadcast mask that allows multiple CNIs to receive the same control and programming signals. A single CNI is associated with each MCPE in the networked MCPE array. This CNI controls the reading and writing of the configuration of the MCPE contexts, the MCPE main memory, and the MCPE configuration controller.

The CNS 1004 broadcasts a data stream to the CNIs 1006 that comprises the data necessary to configure the MCPEs 1002. In one embodiment, this data comprises configuration data, address mask data, and destination identification data. FIG. 16 is the encoding of the configuration byte stream as received by the CNI in one embodiment. The first four bytes are a combination of mask and address where both mask and address are 15 bit values. The address bits are only tested when the corresponding mask is set to "1". The high bit of the Address High Byte is a Virtual/Physical identification selection. When set to "1", the masked address is compared to the MCPE virtual, or programmable, identification; when set to "0" the masked address is compared to the MCPE physical address. This address scheme applies to a CNI block whether or not it is in an MCPE.

Following the masked address is a command/context byte which specifies which memory will be read from or written to by the byte stream. FIG. 17 is the encoding of the command/context byte in one embodiment. Following the command/context byte is a byte count value. The byte count indicates the number of bytes that will follow.

Figure 18:
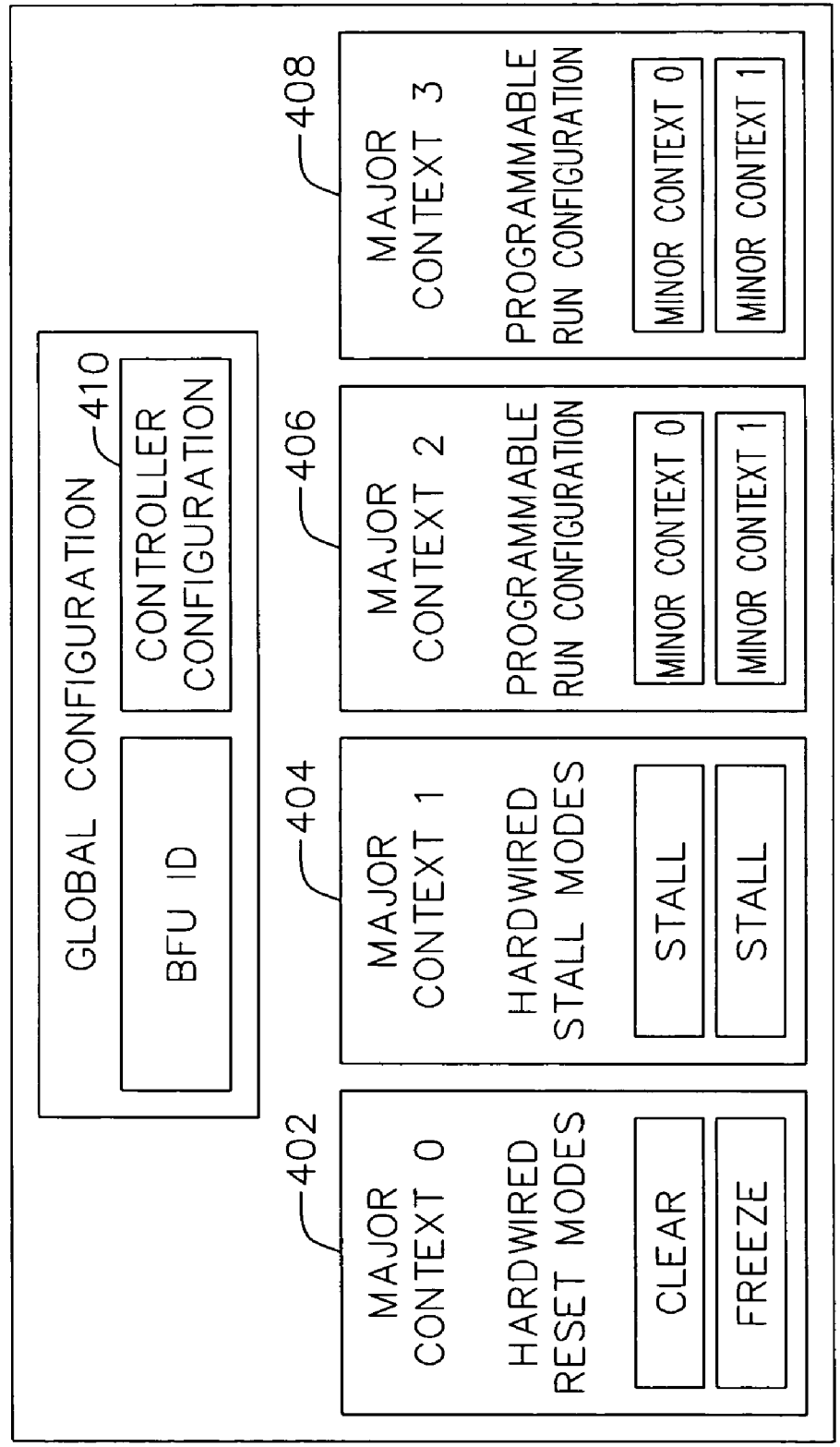
FIG. 18 is the MCPE configuration memory structure of one embodiment.

FIG. 18 is the MCPE configuration memory structure of one embodiment. Each MCPE has four major contexts 402–408 of configuration memory. Each context contains a complete set of data to fully describe the operation of the MCPE, including the local network switching. In one embodiment two of the contexts are hardwired and two are programmable. Each of these contexts includes two independently writeable minor contexts. In the programmable major contexts the minor contexts are a duplication of part of the MCPE configuration consisting primarily of the port configurations. In the hardwired major contexts the minor contexts may change more than just the port configurations. The switching of these minor contexts is also controlled by the configuration control. The minor contexts are identical in structure but contain different run-time configurations. This allows a greater degree of configuration flexibility because it is possible to dynamically swap some parts of the configuration without requiring memories to store extra major contexts. These minor contexts allow extra flexibility for important parts of the configuration while saving the extra memory available for those parts that don't need to be as flexible. A configuration controller 410 finite state machine (FSM) determines which context is active on each cycle. Furthermore, a global configuration network can force the FSM to change contexts.

The first two major contexts (0 and 1) may be hardwired, or set during the design of the chip, although they are not so limited. Major context 0 is a reset state that serves two primary roles depending on the minor context. Major context 1 is a local stall mode. When a MCPE is placed into major context 1 it continues to use the configuration setting of the last non-context 1 cycle and all internal registers are frozen. This mode allows running programs to stall as a freeze state in which no operations occur but allows programming and scan chain readout, for debugging, to occur.

Minor context 0 is a clear mode. Minor context 0 resets all MCPE registers to zero, and serves as the primary reset mode of the chip. Minor context 0 also freezes the MCPE but leaves the main memory active to be read and written over by the configuration network.

Minor context 1 is a freeze mode. In this mode the internal MCPE registers are frozen while holding their last stored value; this includes the finite state machine state register. This mode can be used as a way to turn off MCPE's that are not in use or as a reset state. Minor context 1 is useful to avoid unnecessary power consumption in unused MCPEs because the memory enable is turned off during this mode.

Major contexts 2 and 3 are programmable contexts for user defined operations. In addition to the four major contexts the MCPE contains some configurations that do not switch under the control of the configuration controller. These include the MCPE's identification number and the configuration for the controller itself.

Figure 19:
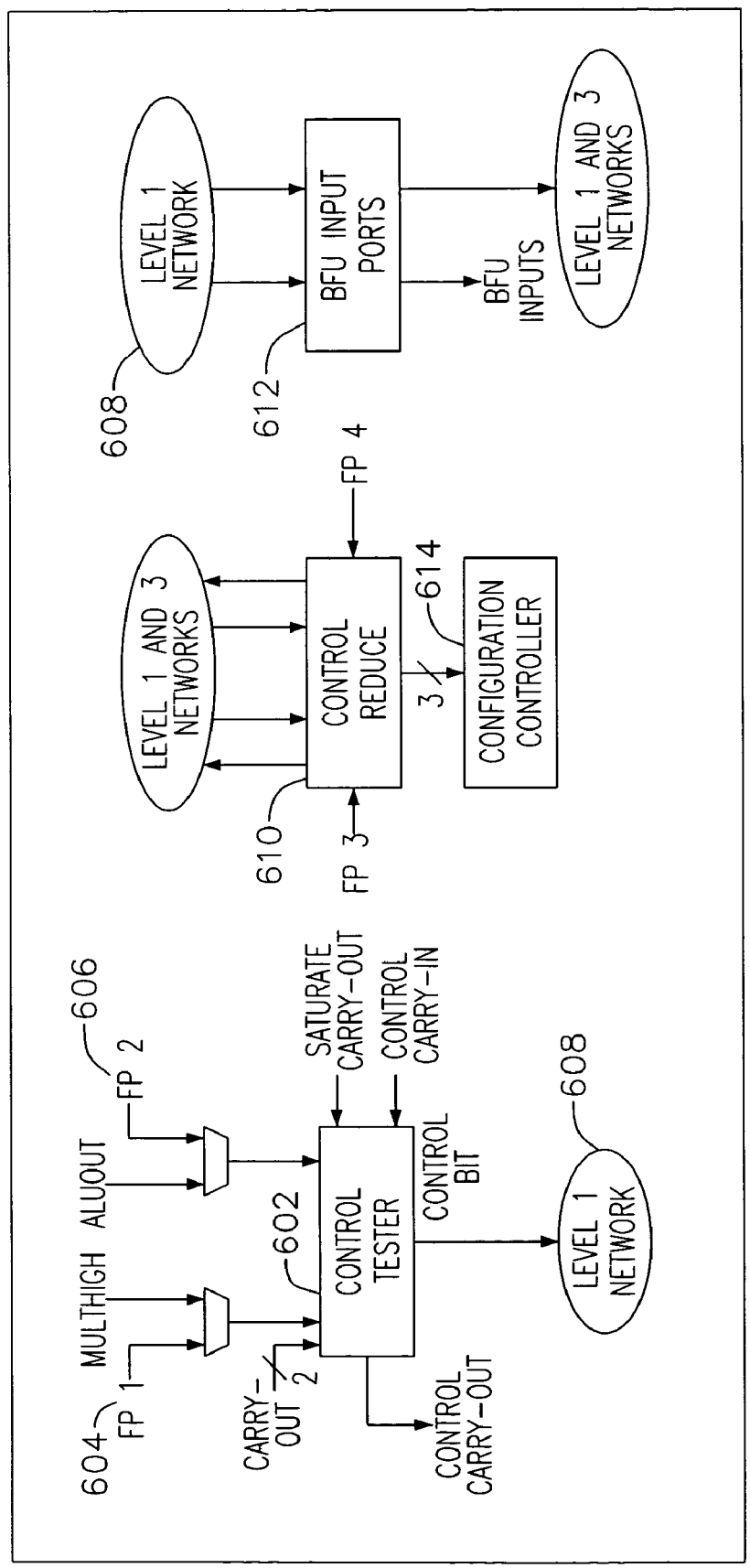
FIG. 19 shows the major components of the MCPE control logic of one embodiment.

FIG. 19 shows the major components of the MCPE control logic structure of one embodiment. The Control Tester 602 takes the output of the ALU for two bytes from floating ports 604 and 606, plus the left and right carryout bits, and performs a configurable test on them. The result is one bit indicating that the comparison matched. This bit is referred to as the control bit. This Control Tester serves two main purposes. First it acts as a programmable condition code generator testing the ALU output for any condition that the application needs to test for. Secondly, since these control bits can be grouped and sent out across the level 2 and 3 networks, this unit can be used to perform a second or later stage reduction on a set of control bits/data generated by other MCPE's.

The level 1 network 608 carries the control bits. As previously discussed, the level 1 network 608 consists of direct point-to-point communications between every MCPE and it's 12 nearest neighbors. Thus, each MCPE will receive 13 control bits (12 neighbors and it's own) from the level 1 network. These 13 control bits are fed into the Control Reduce block 610 and the MCPE input ports 612. The Control Reduce block 610 allows the control information to rapidly effect neighboring MCPEs. The MCPE input ports allow the application to send the control data across the normal network wires so they can cover long distances. In addition the control bits can be fed into MCPEs so they can be manipulated as normal data.

The Control Reduce block 610 performs a simple selection on either the control words coming from the level 1 control network, the level 3 network, or two of the floating ports. The selection control is part of the MCPE configuration. The Control Reduce block 610 selection results in the output of five bits. Two of the output bits are fed into the MCPE configuration controller 614. One output bit is made available to the level 1 network, and one output bit is made available to the level 3 network.

The MCPE configuration controller 614 selects on a cycle-by-cycle basis which context, major or minor, will control the MCPE's activities. The controller consists of a finite state machine (FSM) that is an active controller and not just a lookup table. The FSM allows a combination of local and global control over time that changes. This means that an application may run for a period based on the local control of the FSM while receiving global control signals that reconfigure the MCPE, or a block of MCPEs, to perform different functions during the next clock cycle. The FSM provides for local configuration and control by locally maintaining a current configuration context for control of the MCPE. The FSM provides for global configuration and control by providing the ability to multiplex and change between different configuration contexts of the MCPE on each different clock cycle in response to signals broadcast over a network. This configuration and control of the MCPE is powerful because it allows an MCPE to maintain control during each clock cycle based on a locally maintained configuration context while providing for concurrent global on-the-fly reconfiguration of each MCPE. This architecture significantly changes the area impact and characterization of an MCPE array while increasing the efficiency of the array without wasting other MCPEs to perform the configuration and control functions.

Figure 20:
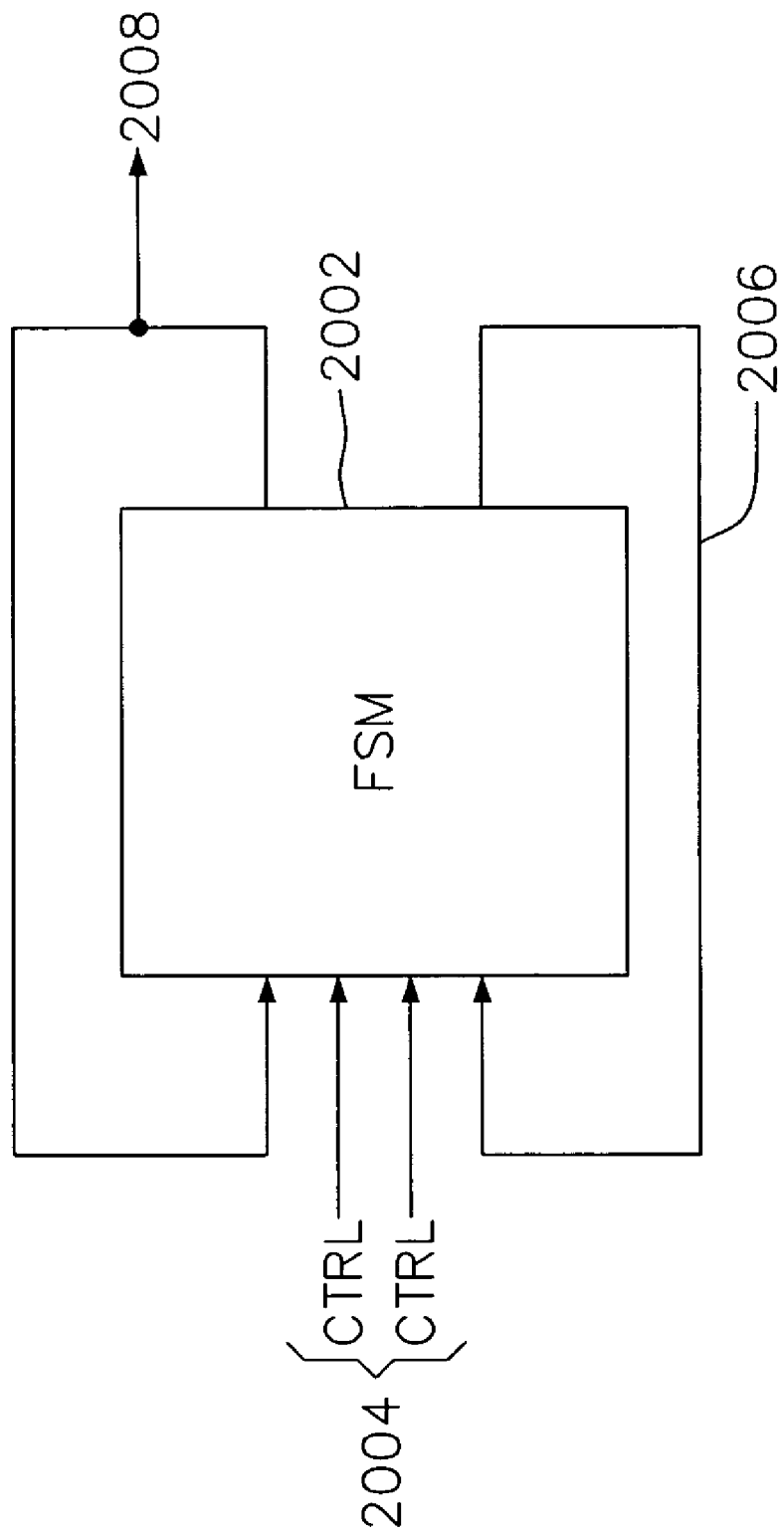
FIG. 20 is the FSM of the MCPE controller of one embodiment.

FIG. 20 is the FSM of the MCPE configuration controller of one embodiment. In controlling the functioning of the MCPE, control information 2004 is received by the FSM 2002 in the form of state information from at least one surrounding MCPE in the networked array. This control information is in the form of two bits received from the Control Reduce block of the MCPE control logic structure. In one embodiment, the FSM also has three state bits that directly control the major and minor configuration contexts for the particular MCPE. The FSM maintains the data of the current MCPE configuration by using a feedback path 2006 to feed back the current configuration state of the MCPE of the most recent clock cycle. The feedback path 2006 is not limited to a single path. The FSM selects one of the available configuration memory contexts for use by the corresponding MCPE during the next clock cycle in response to the received state information from the surrounding MCPEs and the current configuration data. This selection is output from the FSM in the form of a configuration control signal 2008. The selection of a configuration memory context for use during the next clock cycle occurs, in one embodiment, during the execution of the configuration memory context selected for the current clock cycle.

The present invention has been described with reference to specific exemplary embodiments. Various modifications and changes may be made to these embodiments by one of ordinary skill in the art without departing from the broader spirit and scope of the invention as set forth in the following claims.

What is claimed is:

1. A method for dynamically operating a networked array of multiple context processing elements (MCPEs), the method comprising:
   selectively transmitting data over a bidirectional shared bus network, wherein the bidirectional shared bus network comprises a plurality of channels between pairs of MCPEs in the networked array; and
   selectively transmitting a sideband bit, wherein the sideband bit indicates a direction in which the data is transmitted in the shared bus network.

2. The method of claim 1, wherein the shared bus network comprises a shared bus switch structure, and a broadcast network broadcasts configuration data for configuring the switch structure.

3. The method of claim 1, further comprising selectively transmitting first signals over a local area broadcast network between MCPEs, wherein the first signals comprise bit-oriented control signals for controlling respective MCPEs.

4. The method of claim 1, further comprising selectively transmitting second signals over a switched interconnect network between MCPEs, wherein the second signals comprise data, instructions, and addresses of MCPEs within a local group.

5. The method of claim 1, wherein the data comprises configuration data for configuration of MCPEs, instructions and addresses of MCPEs.

6. The method of claim 1, wherein a first sideband bit is transmitted in a first direction and a second sideband bit is transmitted in a second direction, the method further comprising generating an error signal when the first and second sideband bits are driven simultaneously.

7. The method of claim 1, wherein the data is transmitted during execution of a present function by at least one MCPE of the networked array.

8. The method of claim 4, further comprising selecting an active configuration for at least one of the plurality of multiple context processing elements when a masked virtual identification of the at least one of the plurality of MCPEs corresponds to an address of the addresses of MCPEs in the second signal.

9. The method of claim 4, further comprising:
   assigning a physical identification (PID) and a virtual identification (VID) to each of a plurality of MCPEs in the networked array;
   transmitting configuration data for configuration of at least one MCPE, instruction, an address of the at least one MCPE, and an address mask;
   comparing the virtual identification masked with the address mask to addresses of MCPEs; and
   selecting an active configuration for the at least one of the plurality of MCPEs and manipulating the MCPE when the masked virtual identification of the at least one of the plurality of MCPEs corresponds to the address.

10. The method of claim 9, wherein manipulating is selected from the group comprising setting a finite state machine state, setting a programmable run context, setting a reset context, and setting a stall context.

11. A system for dynamically operating a networked array of multiple context processing elements (MCPEs), comprising:
   data selectively transmitted over a shared bus network, wherein the shared bus network comprises a plurality of channels between pairs of MCPEs in the networked array; and
   a sideband bit selectively transmitted, wherein the sideband bit indicates a direction in which the data is transmitted in the shared bus network.

12. The system of claim 11, wherein the shared bus network comprises a shared bus switch structure, and a broadcast network broadcasts configuration data for configuring the shared bus switch structure.

13. The system of claim 11, further comprising first signals selectively transmitted over a local area broadcast network between MCPEs, wherein the first signals comprise bit-oriented control signals for controlling respective MCPEs.

14. The system of claim 11, further comprising second signals selectively transmitted over a switched interconnect network between MCPEs, wherein the second signals comprise data, instructions, and addresses of MCPEs within a local group.

15. The system of claim 11, wherein the data comprises configuration data for configuration of MCPEs, instructions and addresses of MCPEs.

16. The system of claim 11, further comprising a first sideband bit transmitted in a first direction and a second sideband bit transmitted in a second direction, and means for generating an error signal when the first and second sideband bits are driven simultaneously.

17. The system of claim 11, wherein the data is transmitted during execution of a present function by at least one MCPE of the networked array.

18. The system of claim 15, further comprising an active configuration for at least one of the plurality of multiple context processing elements selected when a masked virtual identification of the at least one of the plurality of MCPEs corresponds to an address of the addresses of MCPEs in the second signal.

19. The system of claim 15, further comprising:

means for assigning a physical identification (PID) and a virtual identification (VID) to each of a plurality of MCPEs in the networked array;

configuration data for configuration of at least one MCPE, instruction, an address of the at least one MCPE, and an address mask;

means for comparing the virtual identification masked with the address mask to addresses of MCPEs; and means for selecting an active configuration for the at least one of the plurality of MCPEs and means for manipulating the MCPE when the masked virtual identification of the at least one of the plurality of MCPEs corresponds to the address.

20. The system of claim 19, wherein means for manipulating is selected from the group comprising means for setting a finite state machine state, means for setting a programmable run context, means for setting a reset context, and means for setting a stall context.

* * * * *